Nov. 20, 1923.
F. M. FABER
PHOTOGRAPHIC CAMERA
Filed April 2, 1915
1,475,006
2 Sheets-Sheet 2
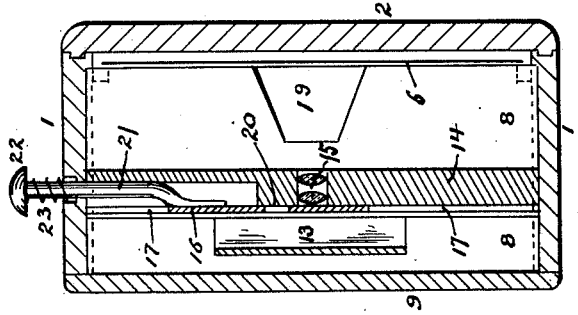
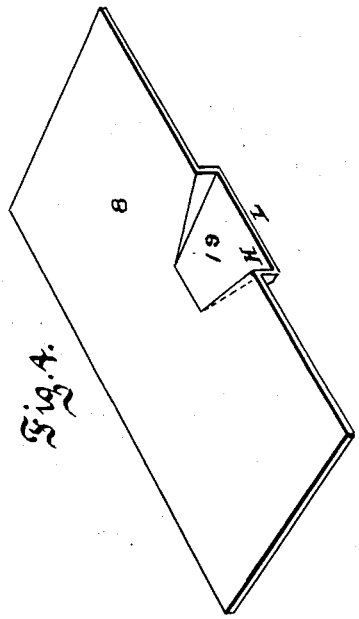
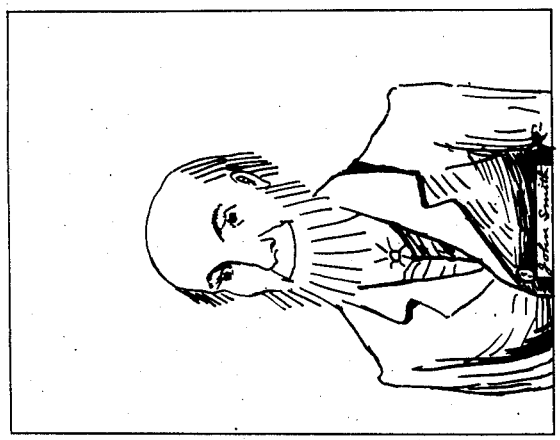
Witnesses
M. C. Mayo.
Jessie Kross
Inventor.
Frank M. Faber.

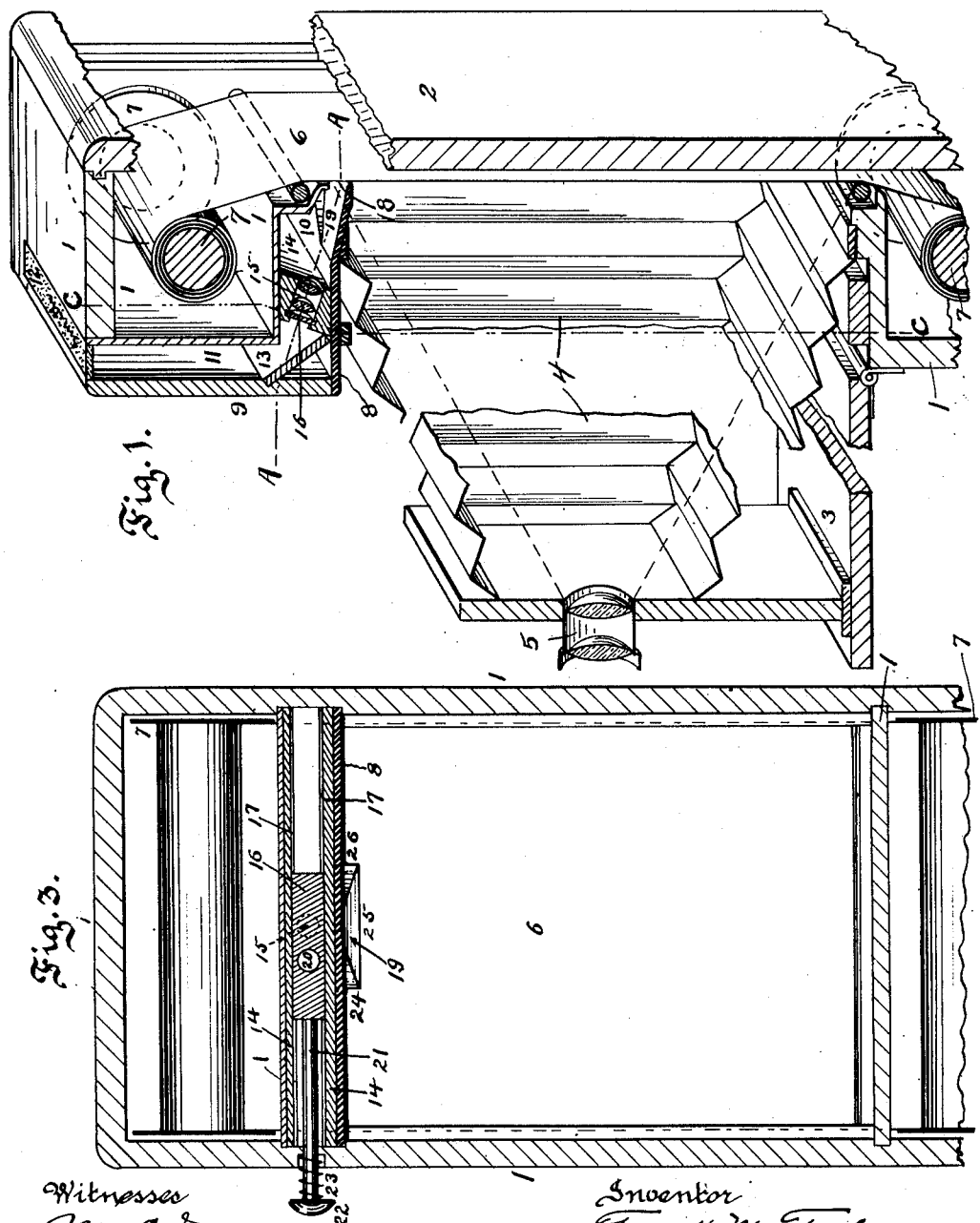

Patented Nov. 20, 1923.

1,475,006

UNITED STATES PATENT OFFICE.

FRANK M. FABER, OF CANTON, OHIO.

PHOTOGRAPHIC CAMERA.

Application filed April 2, 1915. Serial No. 18,662.

*To all whom it may concern:*

Be it known that I, FRANK M. FABER, a citizen of the United States, residing at Canton, in the county of Stark and State of Ohio, have invented a new and useful Improvement in Photographic Cameras, of which the following is a specification.

My invention relates to improvements in photographic cameras and consists in combining, in a single apparatus, two cameras, one for making the picture proper, and the other for photographing adjacent to or within the margin of the picture, the image of a different scene, an inscription or a title description of the picture. Its specific features consist in so arranging the various parts of the apparatus as to occupy a minimum of space, and to provide means whereby the title whose image is photographed on the film may be conveniently written by hand and quickly erased.

In the drawings Fig. 1 is a view partly in section and partly in isometric projection, showing my device applied to a camera of the well known "folding" type.

Fig. 2 a sectional view on the plane A—A.

Fig. 3 a sectional view on the plane C—C, with certain parts removed to show the portion of the film exposed to the lens 5.
Fig. 4 is a perspective view of the part 8.

Fig. 5 shows the finished photograph with title as produced by my arrangement of parts.

1 represents the walls of a camera, 2 the back, 3 the folding front, 4 the bellows, 5 the lens, 6 the sensitized film, 7 the reels on which the film is wound; all of which parts constitute elements of a camera of the type aforementioned, in common use.
To this well known arrangement of parts I add the walls 8 and 9, thus forming an L shaped compartment, having the horizontal and vertical legs 10 and 11 respectively; the inner end of wall 8 being close to or in contact with the film.

The opening at the top of the vertical leg 11, forms a window in which is secured a pane, or tablet 12, of transparent material (preferably glass), which is roughened or ground on its outside surface so that it may be written upon with an ordinary lead pencil. At the angle of the compartment 10—11 is a mirror 13.

14 is a dividing wall in the horizontal leg
10, of the L shaped compartment. 15 is a lens, in the wall 14. A shutter 16, sliding in the grooves 17, opens or closes the lens 15. The mirror is inclined at the proper angle to reflect light entering the window pane 12, into the lens 15, which is so designed as to focus on the film at 18, the image (preferably reduced in size) of the title or inscription inscribed on the ground glass 12.

The leg 10 of the L shaped compartment enters the camera proper to the rear of the bellows thus forming an opening, between the bellows 4 and the film 6 for the admission of light.

The wall 8, (preferably composed of metal), is bent downward on the side adjacent to the film, and acts as a shield to prevent light entering the lens 5, from striking the part of the film acted upon by the lens 15. The bent part 19, may shield a strip the entire width of the film, but as I prefer that it should shield only a portion widthwise of the film, I form the wall 8, as indicated in Figs. 2–3 and 4, wherein the bent portion 19 is shown as a depression, pyramidal in form, extending only part way across the end of wall 8, the height "H" and the length "L" of the base of the pyramid being respectively equal to the height and the length of the image of the window pane 12 formed by lens 15. The object of this arrangement is to permit the picture formed by lens 5 to surround the title or inscription on three of its sides, 24—25—26, as shown in Figs. 3 and 5, in which latter the inscription "John Smith" is shown within and extending only part way along the margin of the finished photograph.

The shutter 16 has the opening 20, and has attached to it the rod 21 having the enlarged head or button 22 and is forced into its closed or normal position, by the spring No. 23.

The operation of my device is as follows:—
An exposure is made through lens 5. A title descriptive of the scene photographed is then inscribed on the window pane 12, when an exposure through lens 15 is made by pressing the button 22 which brings the opening 20 in register with lens 15. The title is then erased and the film reeled into position for taking the next picture.

The mirror 13, as herein applied, is essential for the reason that since the title is inscribed on the outside of the window pane 12 it appears when seen from within compartment 11 as reversed, (that is either upside down or reading from right to left) and in order that it may not so appear on the finished photograph, I introduce the mirror for the purpose of reversing or rectifying the image of the title.

It is also evident that the exterior surface of the window pane might be smooth, and the title inscribed thereon in paint or some such medium, but for convenience, both in inscribing and erasing the title, the method hereinbefore described, is preferable; moreover the use of a ground surface for the purpose herein described, is an element in my invention and has value, since the image of the ground surface itself is focused on the film by lens 15 thus insuring a uniformly illuminated back ground to the title, and preventing images of extraneous objects from being focused on the film, coincident with the title, by lens 15 as might readily occur.

Having thus described my invention I claim and desire to secure by Letters Patent:

1. A hand camera comprising means for focusing the image of a scene on a sensitized surface, an inscription receiving means, means for reflecting a true inscription appearing on said receiving means, and means for vertically and laterally reversing said reflection and for focusing the vertically and laterally reversed reflection on said sensitized surface.

2. A photographic camera comprising means for focusing the image of a scene on a sensitized surface, means for exposing to the sensitized surface within the normal field of exposure of the image focusing means a vertical and lateral reversal of a true inscription and for focusing said reversal of said inscription on said sensitized surface, and means for independently controlling light through said last named means and onto said surface.

3. A photographic camera comprising a lens focusing the image of a scene on a sensitized surface, a transparent window pane attached to the camera and having an inscription on its outer surface, a supplementary lens focusing the image of the inscription on the sensitized surface adjacent to the image of the scene, and means for causing said supplemental lens to receive the desired image of said inscription.

4. A photographic camera comprising a lens focusing the image of a scene on a sensitized film, means for shielding from light entering the lens a strip within the normal field of exposure of the image focusing means and extending within and part way along a margin of the image, a tablet for receiving an inscription, and a supplementary lens forcusing the image of the inscription on said shielded portion of the film.

5. In a photographic camera, a lens for focusing the image of a scene on a sensitized surface, a transparent window pane, ground on the surface exterior to the camera and having an inscription thereon, a supplementary lens focusing the image of the ground surface and inscription on the sensitized surface adjacent to the image of the scene, and means for reflecting the image of the ground surface and inscription to said supplementary lens.

6. A photographic camera comprising a lens focusing the image of a scene on a sensitized film, a bellows, a compartment between the bellows and the film through which light is admitted to the film, a window at the outer end of the compartment having an inscription on its outer surface, and means including a lens within the compartment for focusing the image of the rectified inscription on the film.

7. In a camera a light-tight hollow casing located entirely within the exterior walls of the camera and having means for focusing additional matter on the same sensitized surface as that which receives the principal image, a manually operated light controlling element for the attachment operated from the exterior of the camera and which alone controls the light passing through the light-tight hollow casing to determine the duration of each exposure, and an image or inscription carrier having a surface upon which the additional matter may be produced and from which it may be readily removed, and supported in the attachment in proper position for the image to be focused upon the said sensitized surface.

8. A hand camera having a light-tight hollow casing opening into the interior of the camera, its inner end close adjacent to the focal plane, and provided with means for focusing a supplemental image on the same sensitized surface as that which receives the principal image, a tablet for the reception of the supplemental matter located in the casing and in proper position for said supplemental matter to be focused by the supplemental means upon the sensitized surface, and a movable light-controlling element for the hollow casing located between the tablet and the sensitized surface, and which alone controls the light passing through the supplemental focusing means, determines the duration of each exposure and excludes light from the sensitized surface during the preparation of the supplemental matter.

9. A camera adapted to produce a principal image upon a sensitized member therein, a passage having light-tight walls and opening at one end adjacent to the front of the sensitized member in the camera, the other end being adapted for the reception of light to be conducted to said member, means for producing in the passage a supplemental image on such sensitized member, an exposure-timing shutter to independently control the light passing through said image-producing means alone, and an inscription carrier so supported that the image of the inscription thereon will be projected on the sensitized member in the camera by said supplemental image-producing means.

10. A camera adapted to produce a principal image upon a sensitized member therein, a passage having light-tight walls and opening at one end adjacent to the front of the sensitized member in the camera, the other end being adapted for the reception of light to be conducted to said member, said passage having means for producing therein a supplemental image on such sensitized member, an exposure-timing shutter to independently control the light passing through the supplemental image-producing means alone, and a translucent inscription carrier supported by the camera for the transmission therethrough of light to the last named means so that the image of the inscription on the carrier will be produced by said means upon the sensitized member in the camera.

11. A camera having a casing and adapted to produce a principal image upon a sensitized member in the casing, a passage located entirely within the casing having light-tight walls and opening at one end adjacent to the front of the sensitized member in the casing, the other end being adapted for the reception of light to be conducted to said member, said passage having means for producing therein a supplemental image on such sensitized member, an exposure-timing shutter to independently control the light passing through the supplemental image-producing means alone, and a translucent inscription carrier supported by the camera for the transmission therethrough of light to the last named means so that the image of the inscription on the carrier will be produced by said means upon the sensitized member in the camera.

12. A camera adapted to produce a principal image upon a sensitized member therein, a passage having light-tight walls and opening at one end adjacent to the front of the sensitized member in the camera, the other end being adapted for the reception of light to be conducted to said member, means for producing in the passage a supplemental image on such sensitized member, an exposure-timing shutter to independently control the light passing through said last named image-producing means alone, and an inscription carrier having a surface upon which an inscription may be produced and from which it may be readily erased, the receiver being so supported by the camera that the image of the inscription thereon will be projected on the sensitized member in the camera by said supplemental image-producing means.

13. A camera adapted to produce a principal image upon a sensitized surface, a passage opening into the interior of the camera and having light-tight walls, means for producing in the passage a supplemental image on the same sensitized surface, a movable exposure-timing element arranged to independently control light passing through the supplemental image-producing means alone, and a translucent inscription carrier supported in proper position for the inscription thereon to be projected by the supplemental image-producing means, said passage extending to said inscription carrier and the light entering the passage passing through said carrier.

14. A camera equipped with the usually present devices and adapted to produce a principal image upon the sensitized member therein, a hollow casing having light tight walls and opening at one end adjacent to the front of the sensitized member, the other end being adapted for the reception of light to be conducted to said member, means within said hollow casing for projecting a supplemental image on said sensitized member, a device which alone controls the passage of light through said hollow casing, is physically disassociated from the usually present devices and adapted to operation independently of any other part of the apparatus, and an inscription carrier so located that the image of the inscription thereon will upon the appropriate operation of said device be projected on the sensitized member by said supplemental projecting means.

15. A camera equipped with the usually present devices and adapted to produce a principal image upon a sensitized member therein, a hollow casing having light tight walls located entirely within the camera and opening at one end adjacent to the front of the sensitized member, the other end being adapted for the reception of light to be conducted to said member, means within said hollow casing for projecting a supplemental image on said sensitized member, a device which alone controls the passage of light through said hollow casing, is physically disassociated from the usually present devices and adapted to operation independently of any other part of the apparatus, and an inscription carrier so located that the image of the inscription will upon the appropriate operation of said device be projected on the sensitized member by said supplemental projecting means.

16. A camera equipped with the usually present devices and adapted to produce a principal image upon a sensitized member therein, a hollow casing having light tight walls and opening at one end adjacent to the front of the sensitized member, the other end being adapted for the reception of light to be conducted to said member, means within said hollow casing for projecting a supplemental image on said sensitized member, a device which alone controls the passage of light through said hollow casing, is physically disassociated from the usually present devices and adapted to operation independently of any other part of the apparatus, and a translucent inscription carrier so located that upon the appropriate operation of said device light will be transmitted therethrough and the image of the inscription thereon be projected on the sensitized member by said supplemental projecting means.

17. A camera equipped with the usually present devices and adapted to produce a principal image upon a sensitized member therein, a hollow casing having light tight walls and opening at one end adjacent to the front of the sensitized member, the other end being adapted for the reception of light to be conducted to said member, means within said hollow casing for projecting a supplemental image on said sensitized member, a device which alone controls the passage of light through said hollow casing, is physically disassociated from the usually present devices and adapted to operation independently of any other part of the apparatus, and a translucent inscription carrier having a surface upon which an inscription may be produced and from which it may be readily erased, so located and supported that upon the appropriate operation of said device light will be transmitted therethrough and the image of the inscription thereon be projected on the sensitized member by said supplemental projecting means.

18. A camera equipped with the usually present devices and adapted to produce a principal image upon a sensitized member therein, a hollow casing having light tight walls located entirely within the camera and opening at one end adjacent to the front of the sensitized member, the other end being adapted for the reception of light to be conducted to said member, means within said hollow casing for projecting a supplemental image on said sensitized member, a device which alone controls the passage of light through said hollow casing, is physically disassociated from the usually present devices and adapted to operation independently of any other part of the apparatus, and a translucent inscription carrier having a surface upon which an inscription may be produced and from which it may be readily erased, so located and supported that upon the appropriate operation of said device light will be transmitted therethrough and the image of the inscription thereon be projected on the sensitized member by said supplemental projecting means.

19. A photographic camera, comprising means for focusing the image of a scene on a sensitized surface, inscription receiving means, means for reflecting a true inscription appearing on said inscription means, means for vertically and laterally reversing the reflected image of said inscription and focusing the vertical and lateral reversal on the sensitized surface within the normal field of exposure of said first mentioned image focusing means.

20. In a photographic camera, means for focusing an image on a sensitized surface, a translucent member adapted to receive a true inscription, means for reflecting such inscription, means for laterally and vertically reversing the reflected image and focusing such vertical and lateral reversal on said sensitized surface, and means intermediate said translucent member and said sensitized surface for independently controlling the passage of light through said translucent member to the sensitized surface.

21. In a camera, a supplemental light-tight hollow casing opening into the interior of the camera with its rear end adjacent the sensitized surface, a lens in the casing adapted to focus an image on said sensitized surface, a separate darkslide for the casing supported thereby to control the admission of light to the lens in the casing, and a translucent tablet for the casing upon which to initially produce the image producing matter to be focused by said lens.

22. In a film camera, a supplemental light-tight hollow casing located in the rear of the camera between the film spools and opening into the interior of the camera with its rear end adjacent the sensitized film, a lens in the casing adapted to focus an image on said sensitized surface, a slide for the casing supported thereby to control the admission of light to the lens in the casing, and a translucent tablet for the casing upon which to initially produce the image producing matter to be focused by said lens.

23. In a camera having means for focusing a principal image upon a sensitized surface, a shutter for controlling the light coming through the principal focusing means, a light-tight hollow casing opening into the interior of the camera and having means for focusing a supplemental image on the same sensitized surface, a separate and independently movable light controlling element arranged to control the light passing through the supplemental focusing means, and a translucent image or inscription carrier supported in the proper position for the image or inscription on said carrier to be focused by the supplemental focusing means.

24. In a photographic apparatus, a principal camera obscura arranged to focus the image of a scene on a sensitized surface, in combination with a supplementary camera obscura arranged to focus the reflected image of an inscription on the sensitized surface within the normal field of exposure of the principal camera obscura, and means within the supplementary camera obscura for producing said reflected image.

25. In a photographic apparatus, a principal camera obscura arranged to focus the image of a scene on a sensitized surface, in combination with a supplementary camera obscura arranged to focus the reflected image of an inscription on the sensitized surface within the normal field of exposure of the principal camera obscura, means within the supplementary camera obscura for producing said reflected image, and means for independently controlling the light entering the supplementary camera obscura.

26. In a hand camera, a principal camera obscura arranged to focus the image of a scene on a sensitized surface, in combination with a supplementary camera obscura arranged to focus the reflected image of an inscription on the sensitized surface, means within the supplementary camera obscura for producing said reflected image, and means for independently controlling the light entering the supplementary camera obscura.

27. In a photographic apparatus, a principal camera obscura arranged to focus the image of a scene on a sensitized surface, in combination with a supplementary camera obscura arranged to focus the reflected image of an inscription on the sensitized surface within the normal field of exposure of the principal camera obscura, and means within the supplementary camera obscura for producing said reflected image, the focusing means in the respective camera's obscura being of different focal length.

28. In a hand camera, a principal camera obscura arranged to focus the image of a scene on a sensitized surface, in combination with a supplementary camera obscura arranged to focus the reflected image of an inscription on the sensitized surface, and means within the supplementary camera obscura for producing said reflected image, the focusing means in the respective camera obscura being of different focal length.

29. In a hand camera, means for focusing the image of a scene on a sensitized surface, an inscription receiving means, means intermediate said inscription receiving means and said sensitized surface for diverting light rays from said inscription receiving means, and means intermediate said inscription receiving means and said sensitized surface for vertically and laterally reversing an image received thereby.

FRANK M. FABER.

Witnesses:
M. C. Mayo,
Jessie Krons.